United States Patent [19]

Yanagawa et al.

[11] 4,178,093

[45] Dec. 11, 1979

[54] OPTOMECHANICAL SCANNING APPARATUS FOR COPYING MACHINE

[75] Inventors: Nobuyuki Yanagawa; Yasuhiro Tabata, both of Tokyo, Japan

[73] Assignee: Ricoh Company, Ltd., Tokyo, Japan

[21] Appl. No.: 855,144

[22] Filed: Nov. 28, 1977

[30] Foreign Application Priority Data

Nov. 27, 1976 [JP] Japan .................... 51-142421
Nov. 27, 1976 [JP] Japan .................... 51-142422

[51] Int. Cl.$^2$ ............... G03B 27/00; G03G 15/28; G03B 27/54; G03G 15/32
[52] U.S. Cl. ........................... 355/8; 355/1; 355/67; 355/75
[58] Field of Search ............... 355/1, 3 R, 8, 11, 47, 355/50, 51, 66, 67, 75

[56] References Cited

U.S. PATENT DOCUMENTS

| | | | |
|---|---|---|---|
| 3,833,296 | 9/1974 | Vola et al. | 355/8 X |
| 4,012,142 | 3/1977 | Serikawa | 355/8 X |
| 4,084,895 | 4/1978 | Ogawa et al. | 355/1 |

Primary Examiner—Fred L. Braun
Attorney, Agent, or Firm—Frank J. Jordan

[57] ABSTRACT

A horizontal platen is translatable through a first exposure position above a photoconductive drum for supporting bulky original documents such as books. A first focussing optical fiber array is disposed between the first exposure position and the drum. A sheet feed mechanism is provided at a second exposure position for feedingly scanning original documents in the form of sheets. The second exposure position is on a circle concentric with the first exposure position and a second focussing optical fiber array is disposed between the second exposure position and the drum. The sheet feed mechanism is located below the platen. A directed light source is movable to selectively direct light to the first or second exposure position. In one form of the invention only one focussing optical fiber array is provided which is movable between the first exposure position and the drum or between the second exposure position and the drum.

14 Claims, 9 Drawing Figures

OPTOMECHANICAL SCANNING APPARATUS FOR COPYING MACHINE

BACKGROUND OF THE INVENTION

The present invention relates to an optomechanical scanning apparatus for an electrostatic copying machine.

Until recently, electrostatic copying machines were designed for either general purpose copying or copying original documents in sheet form. The general purpose machines comprise a glass platen which can support a sheet, book or other original document placed face down thereon. An optical system focusses a light image of the original document onto a photoconductive drum or the like to form an electrostatic image through localized photoconduction. The electrostatic image is developed by means of a toner substance to form a toner image which is transferred and fixed to a copy sheet to provide a permanent reproduction of the original document.

The general purpose machines further comprise a reciprocating system for scanning the document. Either the optical system or the platen is moved relative to the drum to scan the document. Since only the forward portion of the reciprocation is used for scanning, the return portion of the reciprocation constitutes wasted time.

The type of copying machine for sheets only increases the copying speed by eliminating the return portion of the reciprocation. This is accomplished by maintaining the platen and optical system stationary and feeding the original document relative to the drum. The sheet feed may be automated since the sheets are fed in only one direction. The obvious disadvantage of this type of machine is that it can not be used for original documents such as books.

To overcome these drawbacks, combination machines have been developed recently which combine scanning systems for both bulky and sheet documents into a single machine. In one type, both a platen and sheet feed mechanism are provided as an integral unit and are movable relative to a fixed optical system for copying bulky documents. This type of machine has the disadvantage that a large drive motor is required to move the heavy sheet feed mechanism in addition to the platen, thereby adding to the size and cost of the machine to a disproportionate extent.

To overcome the drawback of this type of combination copying machine, another type has been developed in which the platen and sheet feed mechanism are held stationary and the optical system is movable for copying bulky documents. This type of machine suffers from the disadvantage of all copying machines comprising movable optical systems in that the optical systems are complicated and expensive to manufacture and difficult to maintain in alignment.

SUMMARY OF THE INVENTION

The present invention overcomes these drawbacks of the prior art by providing a combination copying machine comprising a movable platen for bulky documents and a fixed sheet feed mechanism for documents in sheet form. The exposure positions of the platen and sheet feed mechanism lie on a circle concentric with the axis of a photoconductive drum. Fixed focussing optical fiber arrays are provided between the platen and drum and between the sheet feed mechanism and the drum respectively. A common directed light source is movable to selectively direct light at the platen or sheet feed mechanism. In one form of the invention only one optical fiber array is provided and is movable between the platen and the drum or between the sheet feed mechanism and the drum.

It is an object of the present invention to provide an optomechanical scanning apparatus for an electrostatic copying machine which is capable of scanning bulky documents such as books and documents in sheet form at maximum speed.

It is another object of the present inventon to provide a scanning apparatus which is more versatile and efficient but less complicated and costly than comparable apparatus known heretofore.

It is another object of the present invention to provide a generally improved optomechanical scanning apparatus for an electrostatic copying machine.

Other objects, together with the foregoing, are attained in the embodiments described in the following description and illustrated in the accompanying drawing.

DESCRIPTION OF THE PREFERRED EMBODIMENTS

While the optomechanical scanning apparatus of the invention is susceptible of numerous physical embodiments, depending upon the environment and requirements of use, substantial numbers of the herein shown and described embodiments have been made, tested and used, and all have performed in an eminently satisfactory manner.

Figure 1:
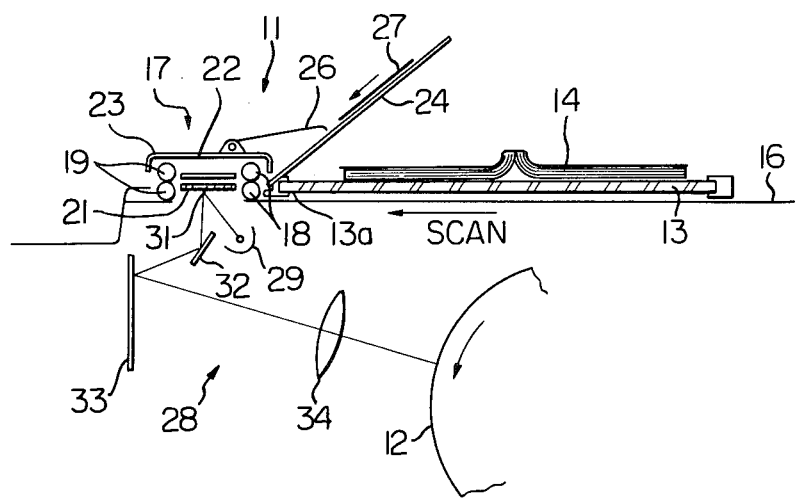
FIG. 1 is a fragmentary schematic view of a prior art electrostatic copying machine.

Referring now to FIG. 1 of the drawing, a prior art electrostatic copying machine is generally designated by the reference numeral 11 and comprises a photoconductive drum 12 which is rotated counterclockwise at constant speed. A glass platen 13 is provided to support a bulky original document such as a book 14 face down and is movable in the leftward direction for scanning along a horizontal support 16.

Integral with the platen 13 is a sheet feed mechanism 17 which comprises inlet feed rollers 18, outlet feed rollers 19, a transparent lower plate 21 and an upper guide plate 22. The sheet feed mechanism 17 further comprises a cover 23 and a guide plate 24 which is hinged to the left edge of the platen 13, swingable to a tilted position as illustrated and supported in the tilted position by means of a hook 26 connected to the cover 23. The guide plate 24 is oriented toward the bite of the inlet feed rollers 18 for guiding an original document in the form of a sheet 27 thereto.

The copying machine 11 further comprises an expsoure optical system which is generally designated as 28 and includes a directed light source 29 which directs or radiates light to an exposure position 31. A light image of a linear portion of the book 14 or sheet 27 in the exposure position 31 is reflected from plane mirrors 32 and 33 through a converging lens 34 which focusses the light image on the drum 12.

To copy the book 14, the platen 13 and sheet feed mechanism 17 are initially moved leftwardly until a left edge of the platen 13, designated as 13a, occupies the exposure position 31. Then, the platen 13 and mechanism 17 are moved leftwardly at the same surface speed as the drum 12 thereby scanning the book 14 and progressively forming an electrostatic image of the book 14 on the drum 12 through localized photoconduction. The electrostatic image is developed by application of a toner substance, transferred and fixed to a copy sheet although these operations are not illustrated. After the scanning operation is completed, the platen 13 and mechanism 17 are moved rightwardly until the left edge 13a of the platen 13 again occupies the exposure position 31.

To copy the sheet 27, the platen 13 and mechanism 17 are moved to the position illustrated in which the center of the plate 21 occupies the exposure position 31. The feed rollers 18 and 19 are rotated clockwise and the sheet 27 slid down the guide plate 24 into the bite of the rollers 18. The rollers 18 and 19 are rotated at such a speed as to feed the sheet 27 through the exposure position 31 at the same surface speed as the drum 12.

The copying machine 11 suffers from the above described drawback that the platen 13 and sheet feed mechanism 17 must be moved integrally for copying bulky documents, and that the power requirements for such movement are disproportionately large. Furthermore, the movement of such a heavy mass tends to be unstable unless the frame and drive means are made disproportionately heavy and rigid.

Figure 2:
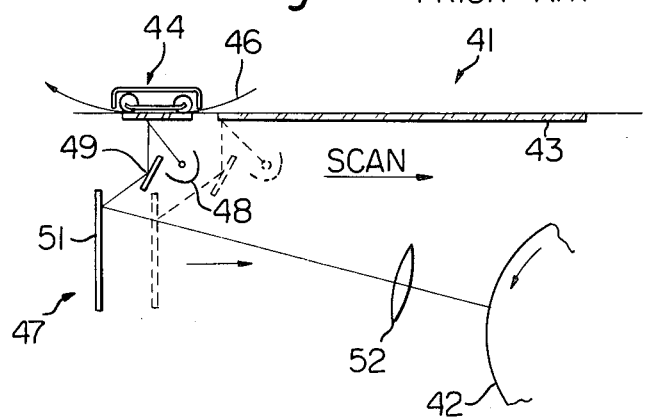
FIG. 2 is similar to FIG. 1 but shows another prior art copying machine.

FIG. 2 shows a second type of prior art copying machine which is generally designated as 41 and comprises a rotary photoconductive drum 42. A stationary glass platen 43 is provided to support books and the like. A stationary sheet feed mechanism 44 which is essentially similar to the sheet feed mechanism 17 and will not be described in detail is provided leftwardly of the platen 43 to feed original documents in sheet form as indicated by an arrow 46. An exposure optical system 47 comprises a light source 48, plane mirrors 49 and 51 and a converging lens 52 which serve the same functions as the corresponding elements in FIG. 1. However, the light source 48 and mirror 49 are moved rightwardly at the same surface speed as the drum 42 for scanning bulky documents and the mirror 51 is also moved rightwardly but at one-half the surface speed of the drum 42.

To copy a sheet, the optical system 47 is moved to the solid line position and the sheet (not shown) is fed through the sheet feed mechanism 44. The optical system 47 is maintained stationary and the sheet is scanned by means of movement thereof through the sheet feed mechanism 44.

To copy a book (not shown) or the like supported face down on the platen 43, the optical system 47 is initially moved to the phantom line position. Then, the light source 48, mirror 49 and mirror 51 are moved rightwardly as described above to scan the book. The optical system 47 is returned to the phantom line position after scanning.

The copying machine 41 suffers from the drawback of a complicated and expensive optomechanical scanning system. Furthermore, the upwardly protruding sheet feed mechanism 44 disposed immediately adjacent to the platen 43 interferes with the placement of over-size documents on the platen 43. It is difficult or impossible to copy a portion of a very large book such as an atlas which is larger than the platen 43 since the mechanism 44 prevents the protruding portion of the book from being laid flat on the upper surface of the copying machine 43.

Figure 3:
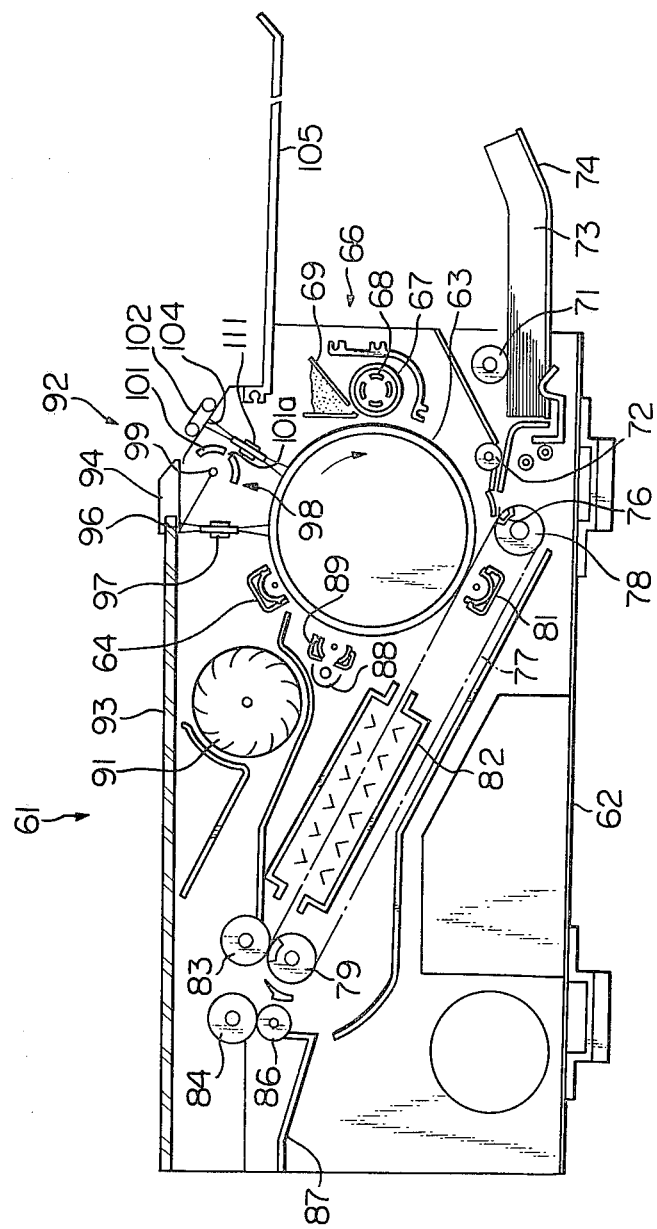
FIG. 3 is a schematic view of an electrostatic copier embodying an optomechanical scanning apparatus of the present invention.

These drawbacks are completely overcome in an electrostatic copying machine 61 of the present invention which is illustrated in FIG. 3. The machine 61 comprises a housing 62 which supports therein a photoconductive drum 63 for clockwise rotation at constant speed. A corona charging unit 64 applies a uniform electrostatic charge to the drum 63 prior to exposure. A magnetic brush type developing unit 66 comprises a dielectric cylinder 67 which is rotated closely adjacent to the drum 63 and a hopper 69 for applying a dry powdered toner substance onto the cylinder 67. A multi-pole magnet 68 fixed inside the cylinder 67 attracts the toner substance to the cylinder 67 to form a magnetic toner brush thereon. The magnetic brush develops an electrostatic image on the drum 63 to form a toner image. Feed rollers 71 and 72 feed the top sheet from a stack of copy sheets 73 provided in a cassette 74 into the bite of a clamp 76. The clamp 76 is spanningly fixed between two endless chains 77, only one of which is visible in the drawing, which in turn are trained around sprockets 78 and 79. As the leading edge of the toner image on the drum 63 approaches the clamp 76, the chains 77 are rotated counterclockwise thereby feeding the sheet 73 in pressing engagement with the drum 63 in such a manner that the sheet 73 registers with the toner image. A transfer charger 81 applies an electrostatic charge to the back of the sheet 73 which causes the toner image to be transferred to the sheet 73. The sheet 73 is then conveyed through a thermal fixing unit 82 which fuses the toner image to the sheet 73. Feed rollers 83, 84 and 86 convey the sheet 73, upon release of the clamp 76, into a discharge tray 87 from which the finished copy may be removed for use.

Subsequent to transfer, a light source 88 and corona discharging unit 89 dissipate the electrostatic charge on the drum 63. The drum 63 is then rotated through a second revolution in which the developing unit 66 functions as a cleaning unit to remove any residual toner substance from the drum 63. Further illustrated in FIG. 3 is a blower 91 which blows air rightwardly thereof to cool the various components of the copying machine 61.

The copying machine 61 further comprises an optomechanical scanning apparatus embodying the present invention which is generally designated as 92. The scanning apparatus 92 comprises a horizontal glass platen 93 which is movably supported on the upper surface of the housing 62. A downwardly slanting guide 94 is provided to the right edge of the platen 93.

The platen 93 is horizontally translatable in the righward direction through an exposure position 96 for scanning bulky original documents such as books placed on the platen 93. A focussing optical fiber array 97 is provided between the exposure position 96 and the drum 63 to focus a light image of a linear portion of the document onto the drum 63. The platen 93 is moved at the same surface speed as the drum 63 for scanning. The exposure position 96 is illuminated by a directed light source 98 which comprises a lamp 99 and a reflector 101.

Figure 4:
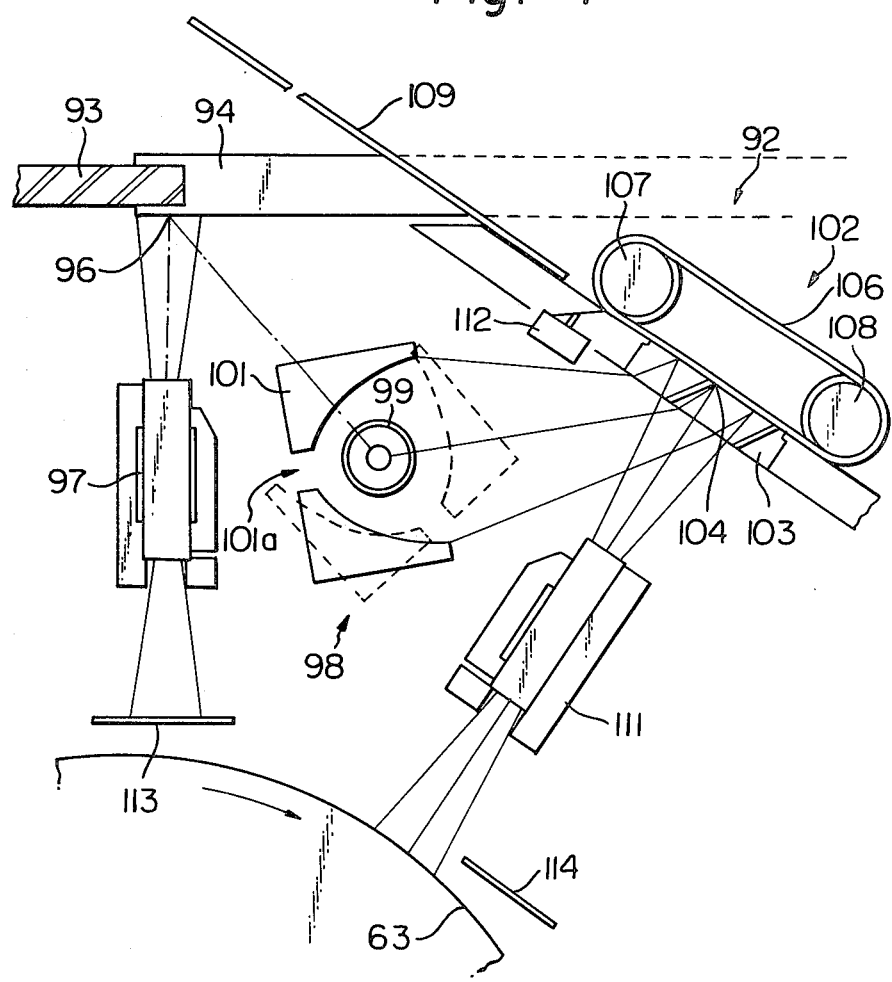
FIG. 4 is a diagrammatic view, to an enlarged scale, of the present apparatus.

The scanning apparatus 92 is illustrated in enlarged form in FIG. 4, and is shown as further comprising a sheet feed mechanism 102 provided below the platen 93 in a generally slanted attitude. The sheet feed mechanism 102 comprises a transparent glass plate 103 provided at an exposure position 104. An endless belt 106 driven by rollers 107 and 108 in the counterclockwise direction feeds an original document in the form of a sheet 109 over the surface of the plate 103 and thereby through the exposure position 104. The guide 94 aids in feeding the sheet 109 into the bite of the belt 106. A receiving tray 105 is provided to receive the sheets after they are fed through the mechanism 102. The sheets are stacked face down in the tray 105 in the same order they were fed through the mechanism 102.

Another focussing optical fiber array 111 is provided between the exposure position 104 and the drum 63 to focus a light image of a linear portion of the sheet 109 onto the drum 63. The sheet 109 is fed by the belt 106 at the same surface speed as the drum 63, thereby scanning the sheet 109 and forming an electrostatic image thereof on the drum 63. A microswitch 112 provided at the inlet of the mechanism 102 is closed by the leading edge of the sheet 109 and triggers the copying cycle.

In accordance with an important feature of the present invention, the sheet feed mechanism 102 is provided below the platen 93 so that the platen 93 clears the mechanism 102 during scanning movement thereof. The mechanism 102 does not protrude above the surface of the platen 93 so that a large book such as an atlas can be advantageously supported by the platen 93 for copying.

The exposure positions 96 and 104 are designed to lie on a circle concentric with the drum 63. The arrays 97 and 111 are identical, and identical images are formed thereby on the drum 63. The lamp 99 is disposed on a line bisecting the angle between the center of the drum 63 and the exposure positions 96 and 104, or circumferentially halfway between the exposure positions 96 and 104. As illustrated in FIG. 4, the reflector 101 is rotatable so as to selectively direct light to the exposure position 104 as shown in solid line or to the exposure position 96 as shown in phantom line. Shutters 113 and 114 are provided to block the optical path of the array 97 or 111 respectively which is not being used for exposure. The reflector 101 is formed with a slot 101a through which air may be blown by the blower 91, thereby increasing the cooling effect thereof.

Figure 5:
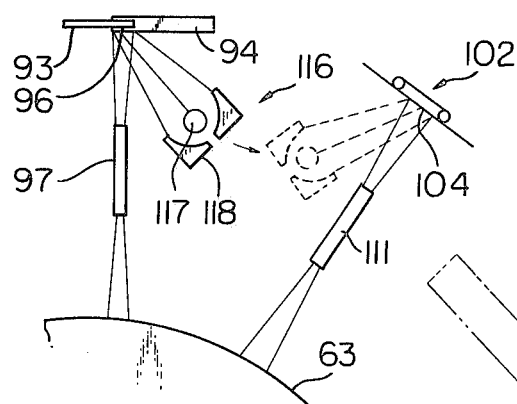
FIG. 5 is similar to FIG. 4 but shows a modification thereof.

FIGS. 5 to 9 illustrate modified embodiments of the present invention in which like or corresponding elements are designated by the same reference numerals. In FIG. 5, a light source 116 comprising a lamp 117 and reflector 118 is not provided halfway between the exposure positions 96 and 104 but is moved in an arc concentric with the drum 63 and rotated between a solid line position and a phantom line position as illustrated. In these two positions, the light source 116 is closer to the respective exposure positions than in the previous embodiment in which the light soruce 98 is always halfway between the exposure positions 96 and 104. The light source 116 directs light at the same distance from and at the same angle to the exposure positions 96 and 104.

Figure 6:
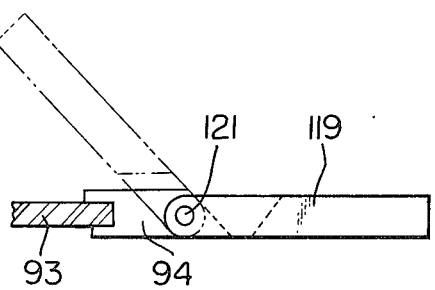
FIGS. 6 and 7 are fragmentary diagrammatic views illustrating additions to the apparatus.

FIG. 6 illustrates an addition to the copying machine 61 comprising a plate 119 hinged to the guide 94 by a shaft 121. The plate 119 is movable between a horizontal position shown in solid line in which it constitutes an extension of the platen 93 and a tilted position shown in phantom line in which it is oriented toward the inlet of the sheet feed mechanism 102. In the horizontal position the plate 119 aids in the support of large books by the platen 93. In the tilted position the plate 119 provides a long guide surface for feeding sheets into the sheet feed mechanism 102.

Figure 7:
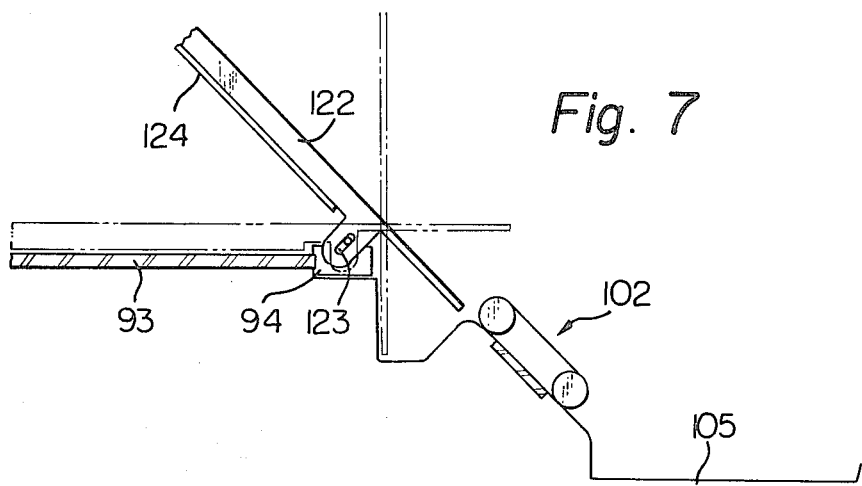

FIG. 7 illustrates a similar plate 122 which is hinged to the guide 94 by a shaft 123. A resilient pad 124 is provided on the lower surface of the plate 122.

The plate 122 is movable between a horizontal phantom line position in which it serves as a pressure plate for pressing a book or the like flat against the platen 93 and a vertical phantom line position for allowing documents to be placed on and removed from the platen 93. The plate 122 may further be latched in a tilted position illustrated in solid line in which it is oriented toward the inlet of the sheet feed mechanism 102. The tilted position is slected for copying sheets since the plate 122 consitutes an elongated guide surface for feeding sheets through the mechanism 102.

Figure 8:
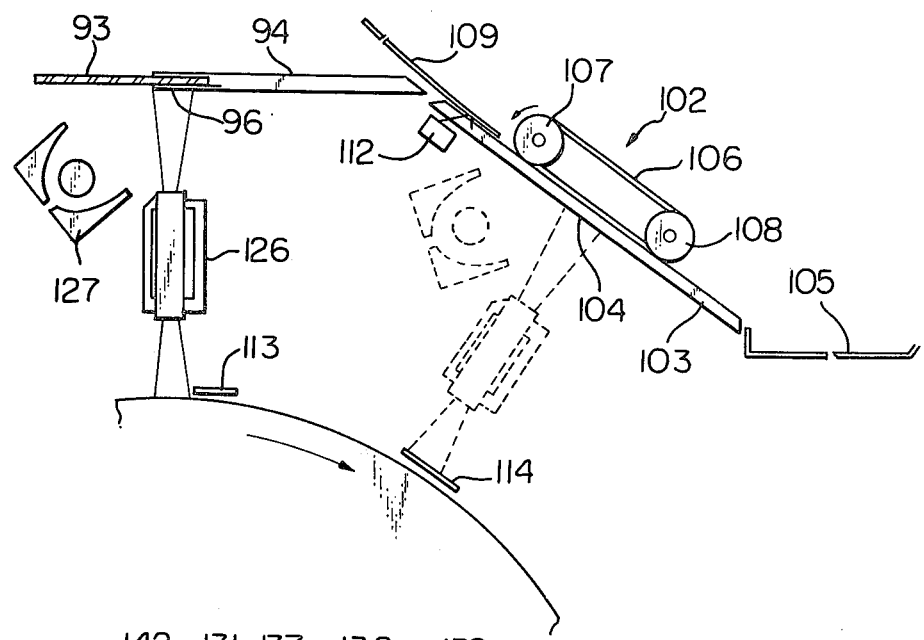
FIG. 8 is a fragmentary diagrammatic view illustrating a second embodiment of the present invention.

Another embodiment of the present invention is shown in FIG. 8 in which the arrays 97 and 11 are replaced by a unitary focussing optical fiber array 126. The array 126 as well as a light source 127 are movable in an arcuate manner concentrically with the drum 63 to selectively occupy the positions of the array 97 and 111 as indicated in solid and phantom line respectively.

Figure 9:
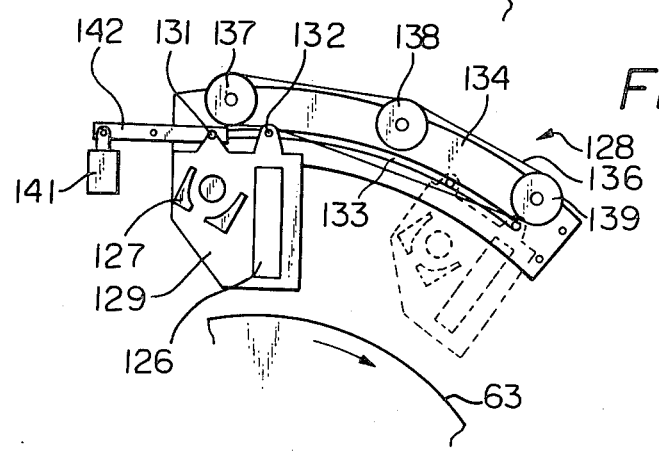
FIG. 9 is a schematic view of a mechanism for the embodiment of FIG. 8.

FIG. 9 illustrates a drive mechanism 128 for moving the array 126 between the two positions, which comprises a support 129 to which the array 126 and light source 127 are rigidly fixed. Pins 131 and 132 extending from the support 129 engage in an arcuate slot 133 formed in a guide plate 134. The slot 133 is concentric with the drum 63. A chain 136 which is trained around pulleys 137, 138 and 139 is fixed to the support 129. Driving rotation of one of the pulleys 137 to 139 causes the support 129 and thereby the array 126 and light source 127 to be guidingly moved between the solid and phantom line positions as illustrated. A latch lever 142 is controlled by a solenoid 141 to engage the pin 131 and hold the support 129 in the solid line position where desired.

In summary, it will be seen that the present invention provides a combination copying machine for both bulky documents and sheets which maximizes copying speed and efficiency. The components of the copying machine are of reduced size, complexity and cost compared to the prior art and do not interfere with the placement of original documents for copying. Various modifications will become possible for those skilled in the art after receiving the teachings of the present disclosure without departing from the scope thereof. For example, the light source 98 may be replaced by a directional fluorescent lamp or the like. Since it is more advantageous to control the exposure intensity utilizing focussing optical fiber arrays by means of varying the level of electrical power applied to the light source 98 than by using a diaphragm, such exposure control means may be provided although not shown. It is further possible to proportion the copying machine 63 so that the sheet feed mechanism 102 is capable of handling sheet documents which are twice as long as the maximum document length which can be accomodated on the platen 93. It is

What is claimed is:

1. In an electrostatic copying machine including a rotary photoconductive drum, the combination comprising:
   a horizontal platen translatable through a first exposure position;
   a sheet document feed means provided at a second exposure position, the second exposure position being located below the first exposure position on a circle concentric with the drum, the document feed means being located below the platen;
   first optical focussing means provided between the platen and the drum for focussing a light image from the first exposure position onto the drum; and
   second optical focussing means provided between the sheet feed means and the drum for focussing a light image from the second expsoure position onto the drum circumferentially spaced from the light image focussed on the drum by the first optical focussing means.

2. A copying machine as in claim 1, further comprising a directed light source provided circumferentially halfway between the first and second exposure positions, the light source being rotatable to selectively direct light to the first and second exposure positions at substantially equal angles respectively.

3. A copying machine as in claim 1, further comprising a directed light source provided circumferentially between the first and second exposure positions, the light source being movable in an arc concentric with the drum and rotatable to selectively direct light to the first and second exposure positions at equal distance therefrom and equal angles respectively.

4. A copying machine as in claim 1, in which the first and second focussing means comprise first and second focussing optical fiber arrays respectively.

5. A copying machine as in claim 1, in which the first and second focussing means are integral and comprise an optical focussing element which is slectively movable between the first exposure position and the drum and between the second exposure position and the drum.

6. A copying machine as in claim 5, further comprising a light source integrally movable with the focussing element for selectively directing light to the first and second exposure positions.

7. A copying machine as in claim 5, further comprising guide means for guiding the optical element in an arc concentric with the drum.

8. A copying machine as in claim 7, in which the guide means comprises a support member for supporting the optical element, two pins extending from the support member and a guide plate formed with an arcuate slot concentric with the drum, the pins engaging in the slot.

9. A copying machine as in claim 1, further comprising a plate provided to an edge of the platen adjacent to the sheet feed means, the plate being tiltable from a first horizontal position in which the plate constitutes an extension of the platen and a second tilted position in which the plate is oriented toward an inlet of the sheet feed means.

10. A copying machine as in claim 1, further comprising a plate provided to an edge of the platen, the plate being tiltable between a first horizontal position in which the plate constitutes a pressure plate for the platen and a second tilted position in which the plate is oriented toward an inlet of the sheet feed means.

11. A copying machine as in claim 1, in which the first optical focussing means focusses the light image from the first exposure position onto a vertically uppermost position on the drum, the second optical focussing means focussing the light image from the second exposure position onto the drum at a position downstream of the vertically uppermost position.

12. A copying machine as in claim 1, further comprising shutter means for selectively blocking one of the light images from the first and second exposure positions.

13. A copying machine as in claim 1, in which the sheet document feed means comprises a slanted transparent glass plate provided at the second exposure position.

14. An electrostatic copying machine for copying bulky and sheet original documents comprising, in combination:
   a rotary photoconductive drum;
   a horizontal transparent platen translatable through a first expsoure position for supporting the bulky original documents;
   a sheet document feed means provided at a second exposure position for feedingly scanning the sheet original documents, the second exposure position being located below the first exposure position on a circle concentric with the drum, the document feed means being located below the platen;
   first optical focussing means provided between the platen and the drum for focussing a light image of the bulky original documents onto the drum; and
   second optical focussing means provided between the sheet feed means and the drum for focussing a light image of the sheet original documents onto the drum circumferentially spaced from the light image of the bulky original documents focussed on the drum by the first optical focussing means.

* * * * *